United States Patent
Damnjanovic et al.

(10) Patent No.: US 12,052,748 B2
(45) Date of Patent: Jul. 30, 2024

(54) LOGICAL CHANNEL PRIORITIZATION ENHANCEMENTS FOR JITTER SENSITIVE TRAFFIC

(71) Applicant: QUALCOMM Incorporated, San Diego, CA (US)

(72) Inventors: Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/525,287

(22) Filed: Nov. 12, 2021

(65) Prior Publication Data

US 2023/0156778 A1    May 18, 2023

(51) Int. Cl.
*H04W 72/04* (2023.01)
*H04W 28/02* (2009.01)
*H04W 72/12* (2023.01)
*H04W 72/23* (2023.01)
*H04W 72/542* (2023.01)
*H04W 72/566* (2023.01)

(52) U.S. Cl.
CPC ......... *H04W 72/569* (2023.01); *H04W 72/23* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2017/0111927 A1* | 4/2017 | Kim | H04W 72/21 |
| 2017/0118766 A1* | 4/2017 | Baek | H04W 72/1268 |
| 2017/0289983 A1* | 10/2017 | Lei | H04W 72/21 |
| 2018/0227941 A1* | 8/2018 | Zhang | H04W 72/21 |
| 2022/0150748 A1* | 5/2022 | Jo | H04W 28/0268 |
| 2022/0225290 A1* | 7/2022 | Ganesan | H04W 72/56 |

* cited by examiner

*Primary Examiner* — Sai Aung
(74) *Attorney, Agent, or Firm* — Patterson & Sheridan, L.L.P/Qualcomm incorporated

(57) ABSTRACT

Certain aspects of the present disclosure provide techniques for wireless communications by a user equipment (UE), comprising receiving, from a network entity, an uplink grant indicating uplink resources, allocating the uplink resources to one or more logical channels (LCHs) based on a procedure that takes into account relative packet transmission delay bounds for at least a first LCH of the LCHs, and transmitting, to the network entity, traffic for the LCHs on the uplink resources in accordance with the allocation.

28 Claims, 14 Drawing Sheets

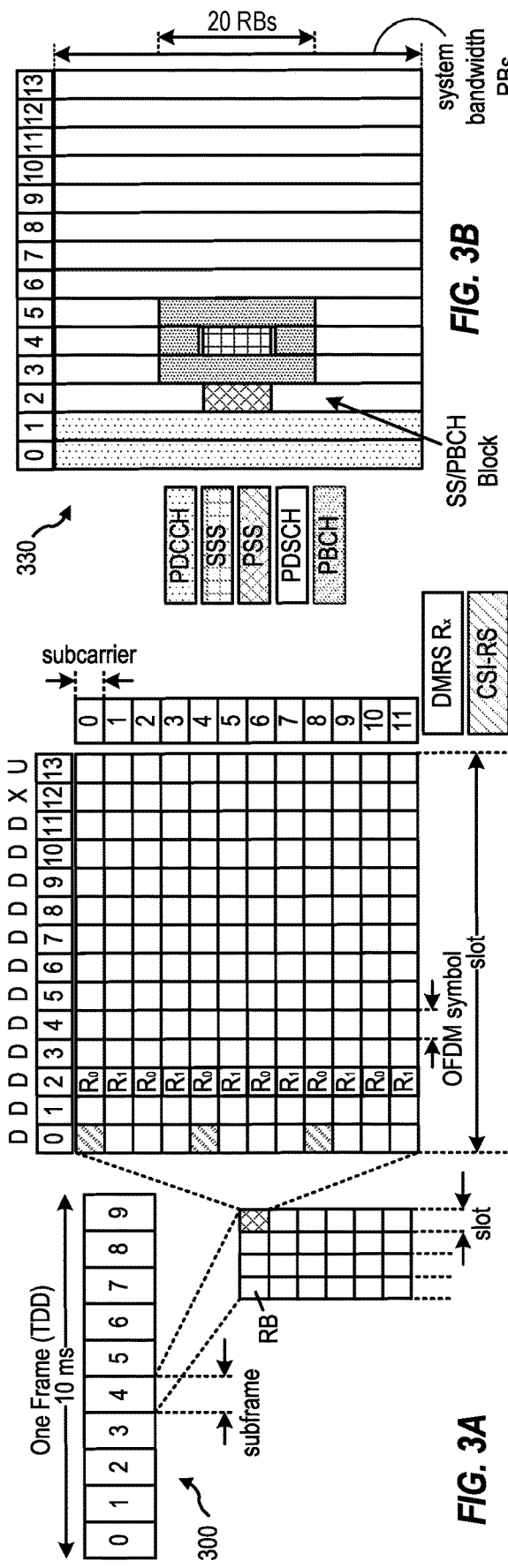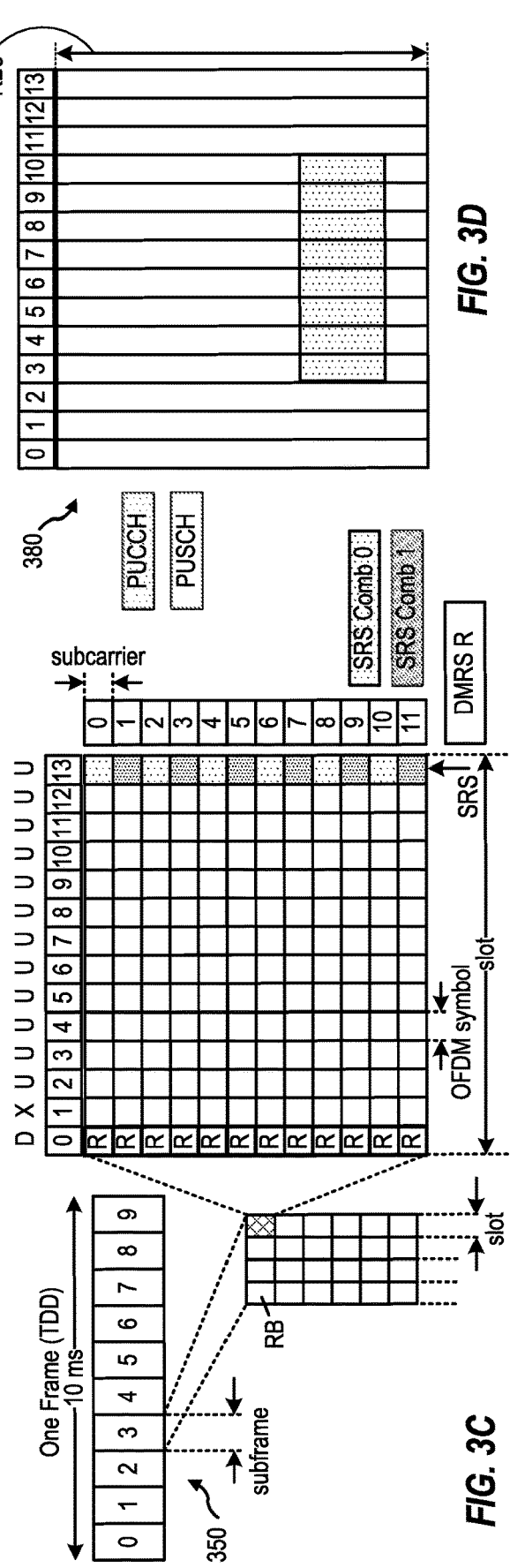

LOGICAL CHANNEL PRIORITIZATION ENHANCEMENTS FOR JITTER SENSITIVE TRAFFIC

INTRODUCTION

Aspects of the present disclosure relate to wireless communications, and more particularly, to techniques for enhancing logical channel prioritization using relative packet transmission delay bounds.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method may include receiving, from a network entity, an uplink grant indicating uplink resources. The method may include allocating the uplink resources to one or more logical channels (LCHs) based on a procedure that takes into account relative packet transmission delay bounds for at least a first LCH of the LCHs. The method may include transmitting, to the network entity, traffic for the LCHs on the uplink resources in accordance with the allocation.

One aspect provides a method for wireless communications by a network entity. The method may include transmitting, to a UE, an uplink grant indicating uplink resources. The method may include determining how the UE is to allocate the uplink resources to one or more logical channels (LCHs) based on a procedure that takes into account relative packet transmission delay bounds for at least a first LCH of the LCHs. The method may include processing traffic for the LCHs, transmitted from the UE on the uplink resources, in accordance with the allocation.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for enhancing logical channel (LCH) prioritization using relative packet transmission delay bounds.

In 5G new radio (NR), data carried across a wireless network may be organized into a set of logical channels (LCHs). LCHs provide transfer services for different 5G data types, allowing a network to effectively monitor and manage data flow. In certain cases, a UE may transmit traffic on LCHs in response to an uplink (UL) grant from a network entity. The UE may multiplex (traffic for) multiple LCHs on resources indicated the UL grant.

The UE that multiplexes LCHs may allocate portions of the resources indicated in the grant according to an LCH prioritization procedure, which may be performed at a medium access control (MAC) layer. Such a procedure may be configured by a Radio Resource Control (RRC) layer to determine resource allocation for each LCH prior to multiplexing. The rules that determine priority may be designed to allow some throughput for lower-priority services. Serving LCHs in a strict priority order could result in starvation of lower-priority LCHs, if all the UL resources exclusively go to the higher-priority channels.

Multiplexed LCH packets transmitted across a network may have differing delays, even if transmitted along the same path. Because packets are routed individually, and network devices receive packets in a queue, a network cannot guarantee constant delay pacing. Delay inconsistency between packets is known as jitter. When packets do not arrive consistently, a receiver makes necessary corrections. In some cases, a receiver cannot make the proper corrections, and packets are lost. Jitter is an issue for real-time communications, including IP telephony, video conferencing, and virtual desktop infrastructure.

Aspects of the present disclosure provide LCH prioritization procedure enhancements that may improve performance when multiplexing for jitter sensitive traffic. In some cases, an LCH prioritization procedure may assign LCH resource priority to each LCH using a priority that has been adjusted to account for potential jitter. This approach may help improve network latency and reduce packet loss, in turn increasing the reliability of LCH transmissions and overall user experience.

Introduction to Wireless Communication Networks

Figure 1:
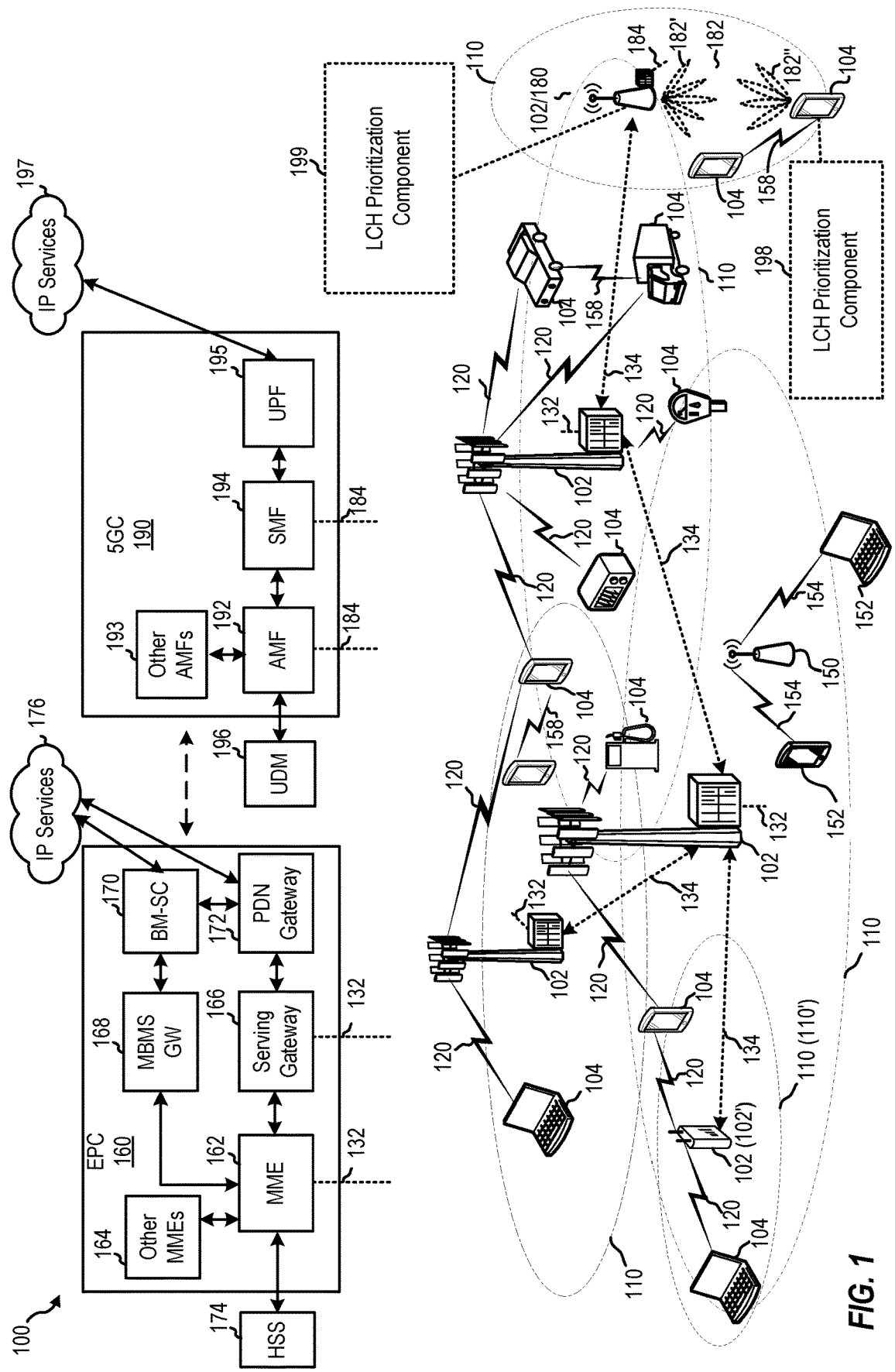
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes logical channel (LCH) prioritization component 199, which may be configured to enhance LCH prioritization based on jitter. Wireless network 100 further includes LCH prioritization component 198, which may be used configured to enhance LCH prioritization based on jitter.

Figure 2:
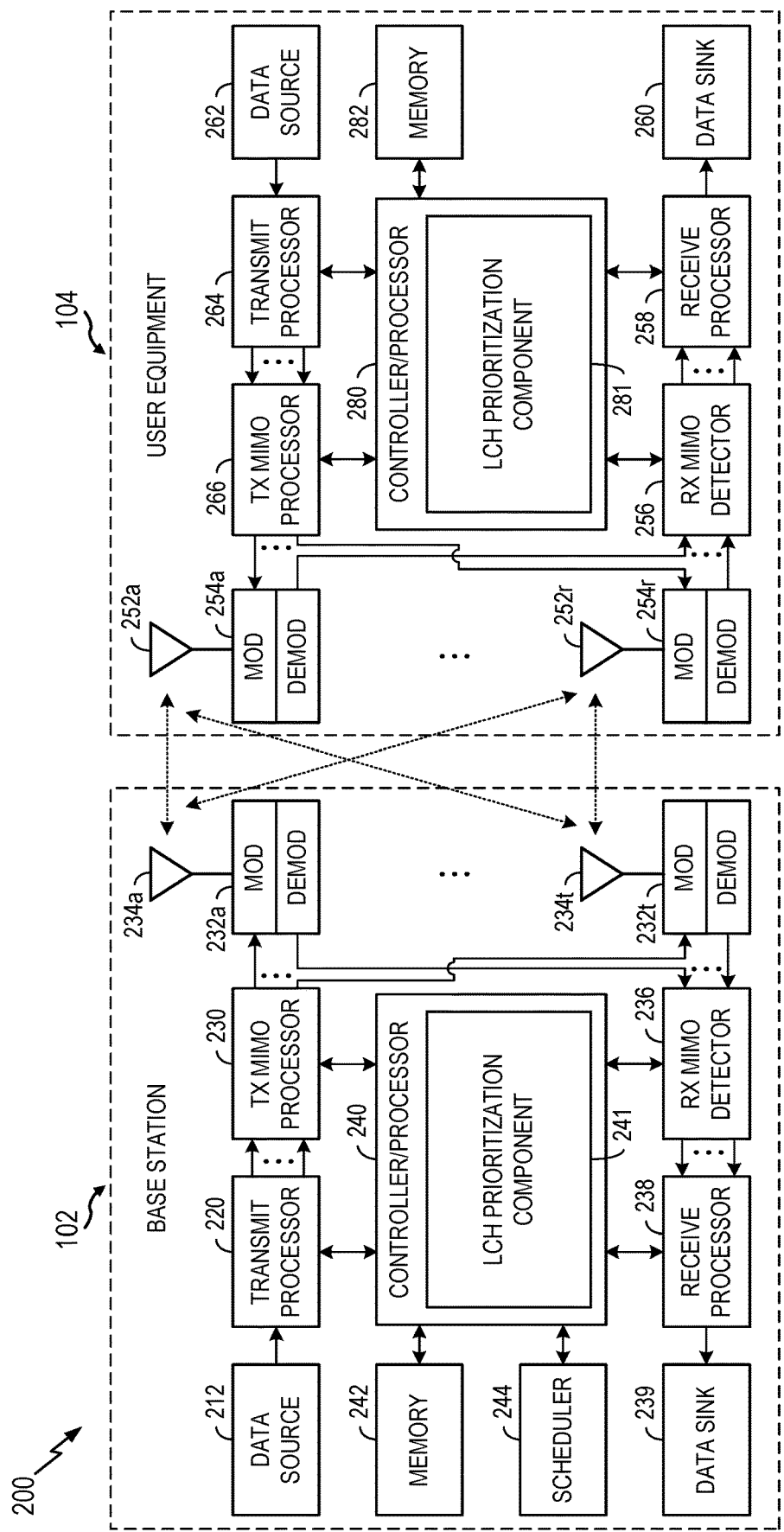
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes LCH prioritization component 241, which may be representative of LCH prioritization component 199 of FIG. 1. Notably, while depicted as an aspect of controller/processor 240, LCH prioritization component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes LCH prioritization component 281, which may be representative of LCH prioritization component 198 of FIG. 1. Notably, while depicted as an aspect of controller/processor 280, LCH prioritization component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example LCH Prioritization

Figure 4:
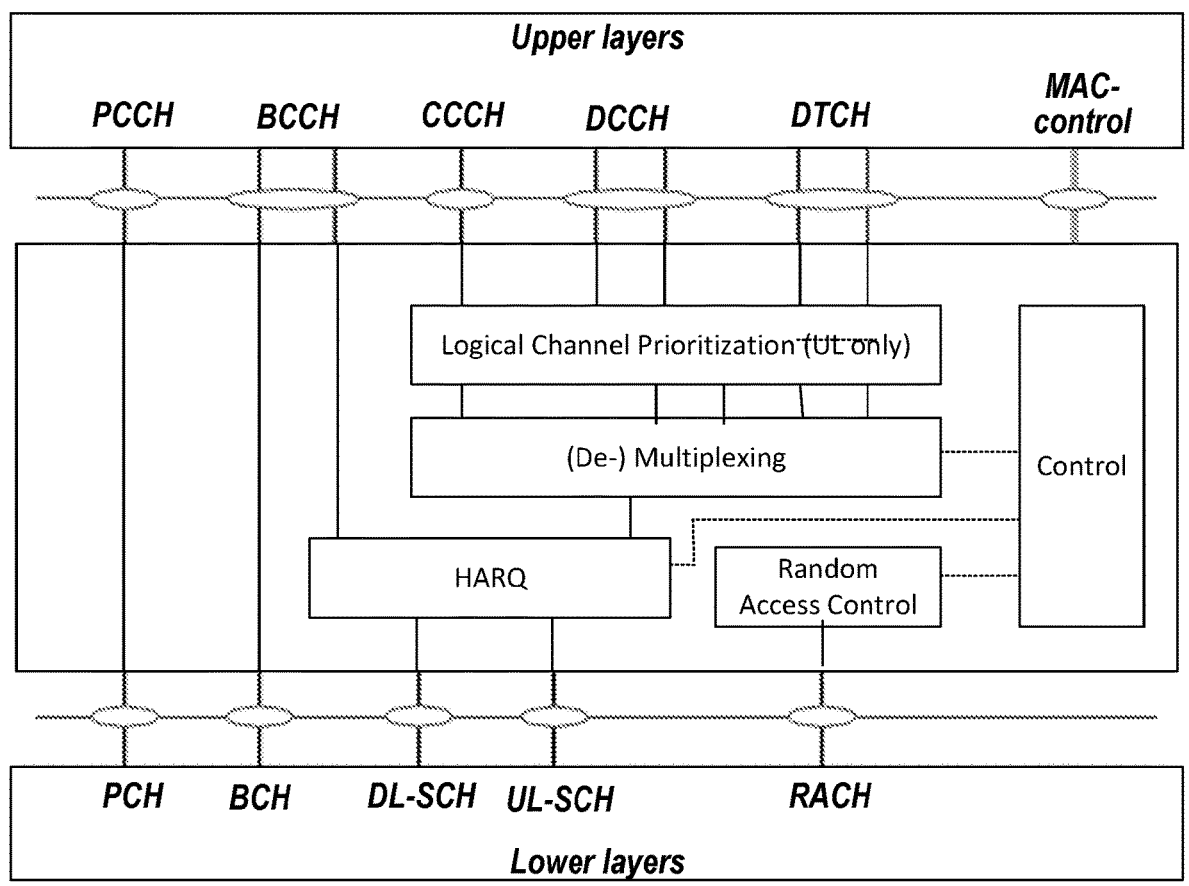
FIG. 4 depicts example medium access control (MAC) layer structure for processing logical channels (LCHs).

In 5G new radio (NR), multiple logical channels (LCHs) may be multiplexed into a same transport block using the medium access channel (MAC) multiplexing functionality as depicted in FIG. 4. The MAC layer lies between an upper layer (e.g., a Radio Resource Control (RRC) layer and a lower layer (e.g., a physical (PHY) layer). LCHs (e.g., paging control channel (PCCH), broadcast control channel (BCCH), common control channel (CCCH), dedicated control channel (DCCH), dedicated traffic channel (DTCH)) that flow through the MAC layer in an uplink (UL) procedure may undergo certain procedures. For example, CCCH, DCCH, and DTCH channels may undergo an LCH prioritization procedure before being multiplexed into a single transport block. After multiplexing, the single transport block may undergo a subsequent hybrid automatic repeat request (HARM) procedure, then may be sent to the MAC-control.

In many cases, because there may be insufficient UL resources to transmit the pending traffic for all of the LCHs, the LCH prioritization procedure may be performed to determine resource allocation for each LCH prior to multiplexing. To prioritize LCHs, each LCH may be assigned a priority value (via RRC configuration), which may be from 1 to 16. For downlink (DL) traffic, a scheduler determines prioritization. For uplink traffic, the user equipment (UE) determines prioritization according to a set of well-defined rules in the device with parameters set by the network in a UL grant and configured at the RRC layer. This ensures the network and UE are in-sync and the network (e.g., gNB) knows how to process (de-multiplex) traffic for the different LCHs from the uplink transmission (e.g., a physical uplink shared channel-PUSCH).

As noted above, the rules that determine priority may be designed to allow some throughput for lower-priority services and avoid starvation. In one case, rules guiding lower-priority throughput assign guaranteed resources to each LCH, where UL resources are assigned in decreasing priority order up to their guaranteed resources. This procedure avoids starvation as long as the scheduled resources are at least as large as the sum of the guaranteed resources. Beyond the guaranteed resources, channels are served in strict priority order until the UL grant is fully exploited, or there are no remaining LCHs in a buffer.

In another case, a token bucket procedure may guide lower-priority throughput based on a set of priority-related parameters configured by the RRC for each LCH. Those priority-related parameters may include priority, prioritized bit rate (PBR) (i.e., prioritisedBitRate), and bucket size duration (BSD) (i.e., bucketSizeDuration). PBR indicates the data rate provided to one logical channel before allocating any resource to a lower-priority logical channel. BSD indicates how much time may be allotted for transmitting uplink data of a LCH by using the PBR until the bucket size is reached.

The PBR and the BSD together serve a similar purpose as the guaranteed resources discussed above, but can account for the different transmission durations. The product of the prioritized bit rate and the bucket size duration results in a bucket of bits that may be transmitted for a given logical channel during a certain time. At each transmission instant, the logical channels are served in decreasing priority order, while trying to fulfill the requirement on the minimum number of bits to transmit. After all LCH are served up to the bucket size, excess capacity leftover is distributed in strict priority order.

Aspects Related to Enhancing LCH Prioritization Using Jitter Information

According to aspects of the present disclosure, rules guiding lower-priority throughput may also be based on relative packet transmission delay, also called jitter.

In a wireless network, packets transmitted continuously on the network will have differing delays, even if transmitted along the same path. Because packets are routed individually, and network devices receive packets in a queue, a network cannot guarantee constant delay pacing. Delay inconsistency between packets is known as jitter. When packets do not arrive consistently, a receiver makes necessary corrections. In some cases, a receiver cannot make the proper corrections, and packets are lost.

Jitter is a particularly significant issue for real-time communications, including IP telephony, video conferencing, and virtual desktop infrastructure. Jitter sensitive traffic such as extended reality (XR), XR-like, and video-plus-voice type of traffic may require not only stringent delay bounds but also relative packet transmission delay bounds to minimize jitter. To make up for jitter, a receiver may utilize a jitter buffer. The jitter buffer collects and stores incoming packets, so that it may determine when to send them in consistent intervals. In the current state of the art, prioritization mechanisms for multiplexed LCHs are semi-statically configured and do not take into account the packet delay bound and jitter. Thus, multiplexed LCHs are subject to greater packet loss during transmission.

Aspects of the present disclosure provide logical channel (LCH) prioritization enhancements for jitter sensitive traffic multiplexing at the user equipment (UE). Traffic multiplexing at a UE for a given UL grant may be based on, for example, the LCH priority or the token bucket procedure with parameters as described above. Enhancements may also involve dynamic changes to priority, as described below.

Figure 5:
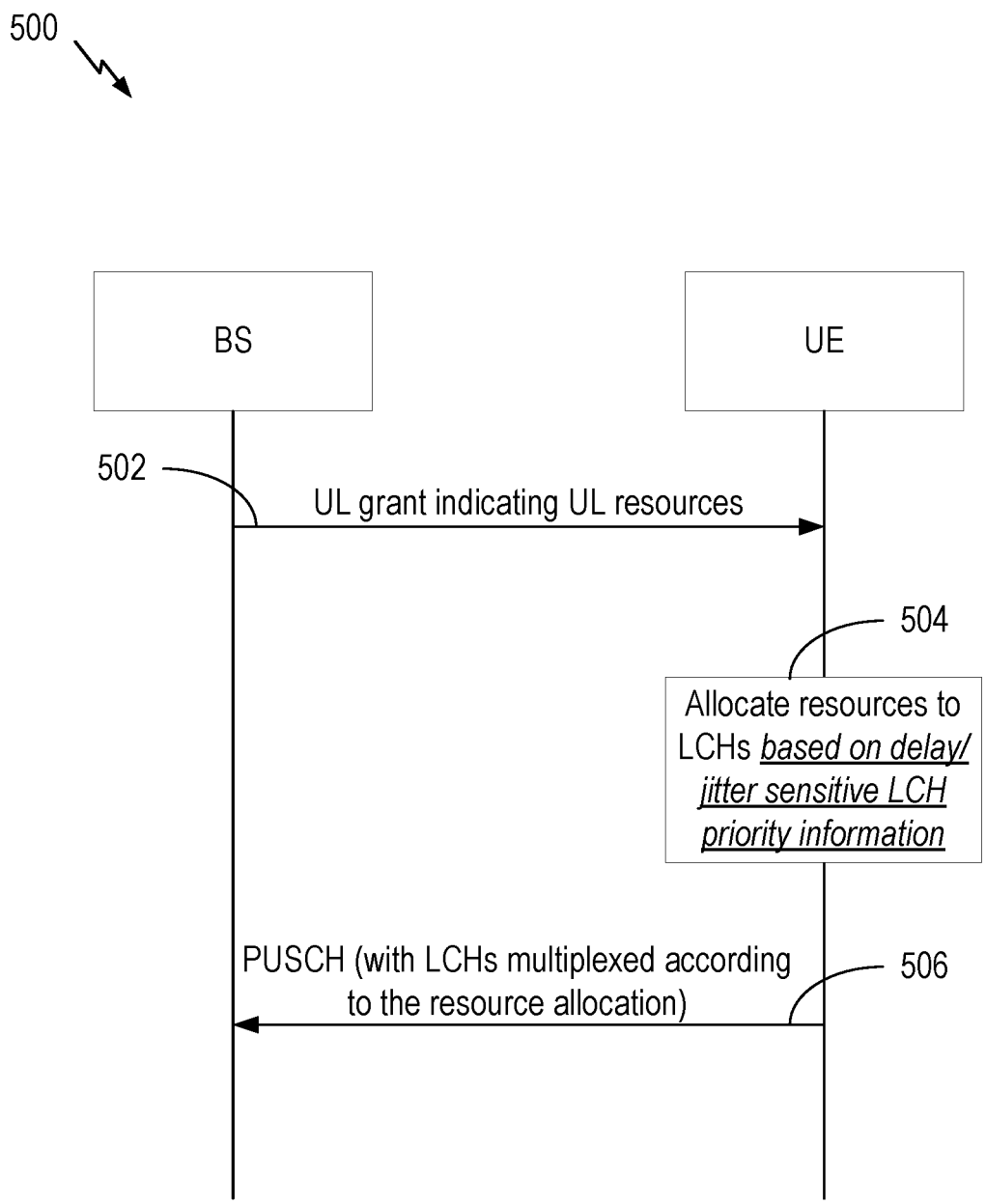
FIG. 5 is a call flow diagram depicting a LCH prioritization procedure between a base station (BS) and a user equipment (UE), in accordance with certain aspects of the present disclosure.

FIG. 5 is a call flow diagram 500 that illustrates an example of a UE multiplexing data for multiple LCHs with enhanced LCH prioritization.

As illustrated, at 502, a BS (e.g., a gNB) sends an UL grant to the UE (e.g., for a PUSCH) indicating UL resources. At 504, the UE allocates resources to LCHs based on delay/jitter sensitive LCH priority information. At 506, the UE transmits a PUSCH with LCHs multiplexed with resources from the UL grant allocated to each LCH, based on the delay/jitter sensitive LCH resource priority information.

The LCH prioritization enhancements proposed herein may help address packet delay/jitter in the traffic multiplexing at the UE using various mechanisms.

Figure 6:
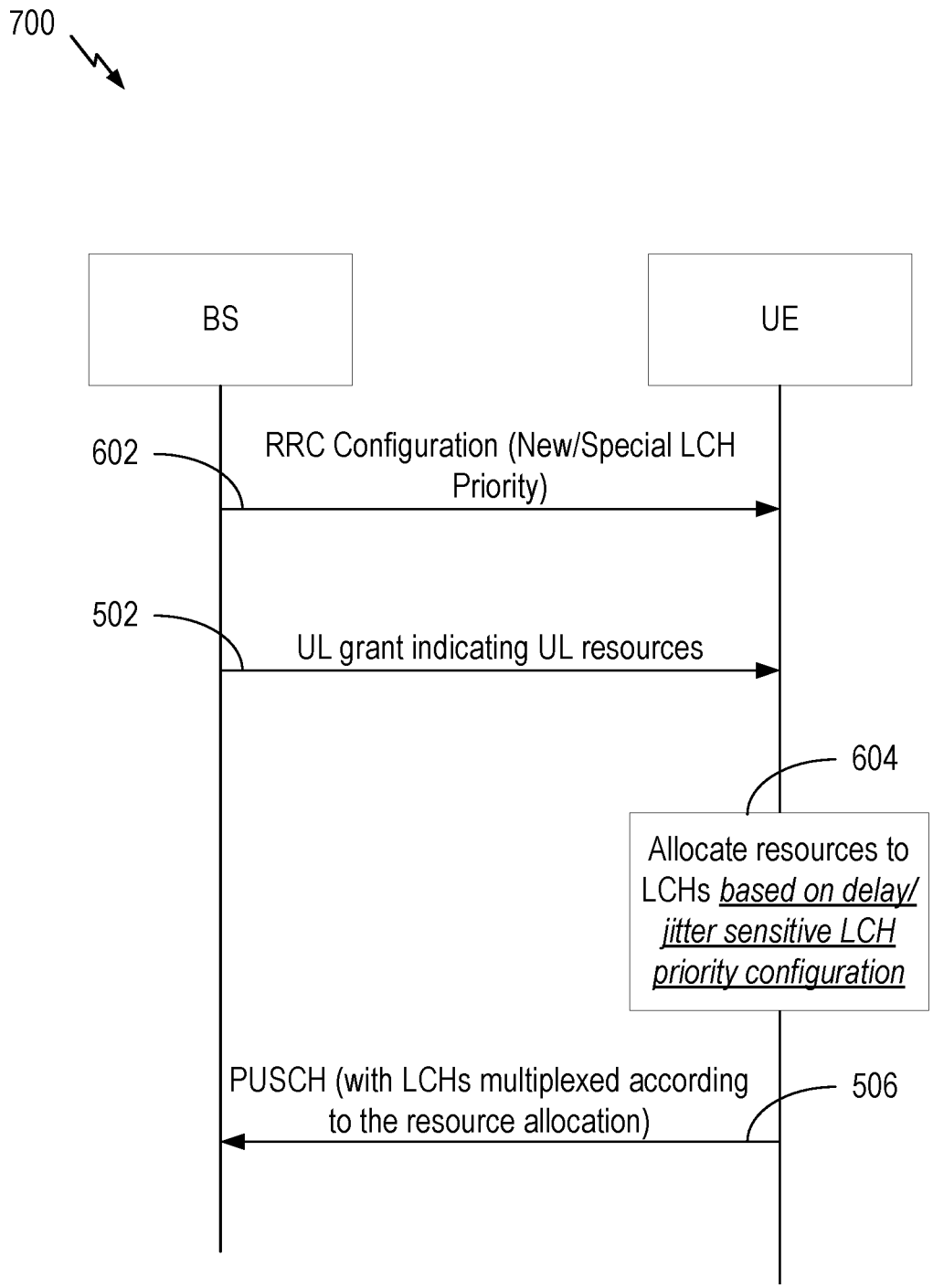
FIG. 6 is a call flow diagram depicting a LCH prioritization procedure having new/special LCH priority, in accordance with certain aspects of the present disclosure.

For example, as illustrated in the example call flow diagram 600 of FIG. 6, in some cases LCH prioritization enhancements may be based on a new (e.g., alternative to conventional) LCH priority definition (e.g., a special LCH priority definition for jitter-sensitive traffic).

The new LCH priority may be conveyed, at 602, as part of an RRC LCH priority configuration. When allocating resources to LCHs, at 604, the UE may do so based on the new LCH priority conveyed in the LCH priority configuration.

The new LCH priority definition may facilitate LCH resource priority to each LCH based on relative packet transmission delay bounds. For example, the new LCH priority may be linked with a certain traffic handling and/or UL grant multiplexing.

The new/alternative LCH priority may indicate that the corresponding traffic is not to be handled based on a legacy (conventional) token bucket procedure. Instead, the UE may assign absolute priority to an LCH associated with the new LCH priority, in a given transmission instance, based on a modified token bucket procedure. The modified token bucket procedure may conform to a new set of priority rules that take into account new attributes, such as packet delay deadline, when determining the amount of resources to assign to each LCH.

In some cases, a new LCH priority configuration may attach and define additional attributes to a corresponding LCH indicated with an existing value of an LCH priority parameter (e.g., that may take a value from 1 to 16). In some cases, a new value of an existing priority parameter used in an RRC configuration may be used to indicate the new LCH priority.

In some cases, an existing value of an LCH priority parameter may be redefined to indicate a special LCH priority. In one case, an additional LCH priority parameter may be added to indicate the special LCH priority. In addition to the special priority parameter, related attributes could be defined, such as packet delay, packet deadline, jitter, or a relation to other LCHs also having configured new LCH priority.

Figure 7:
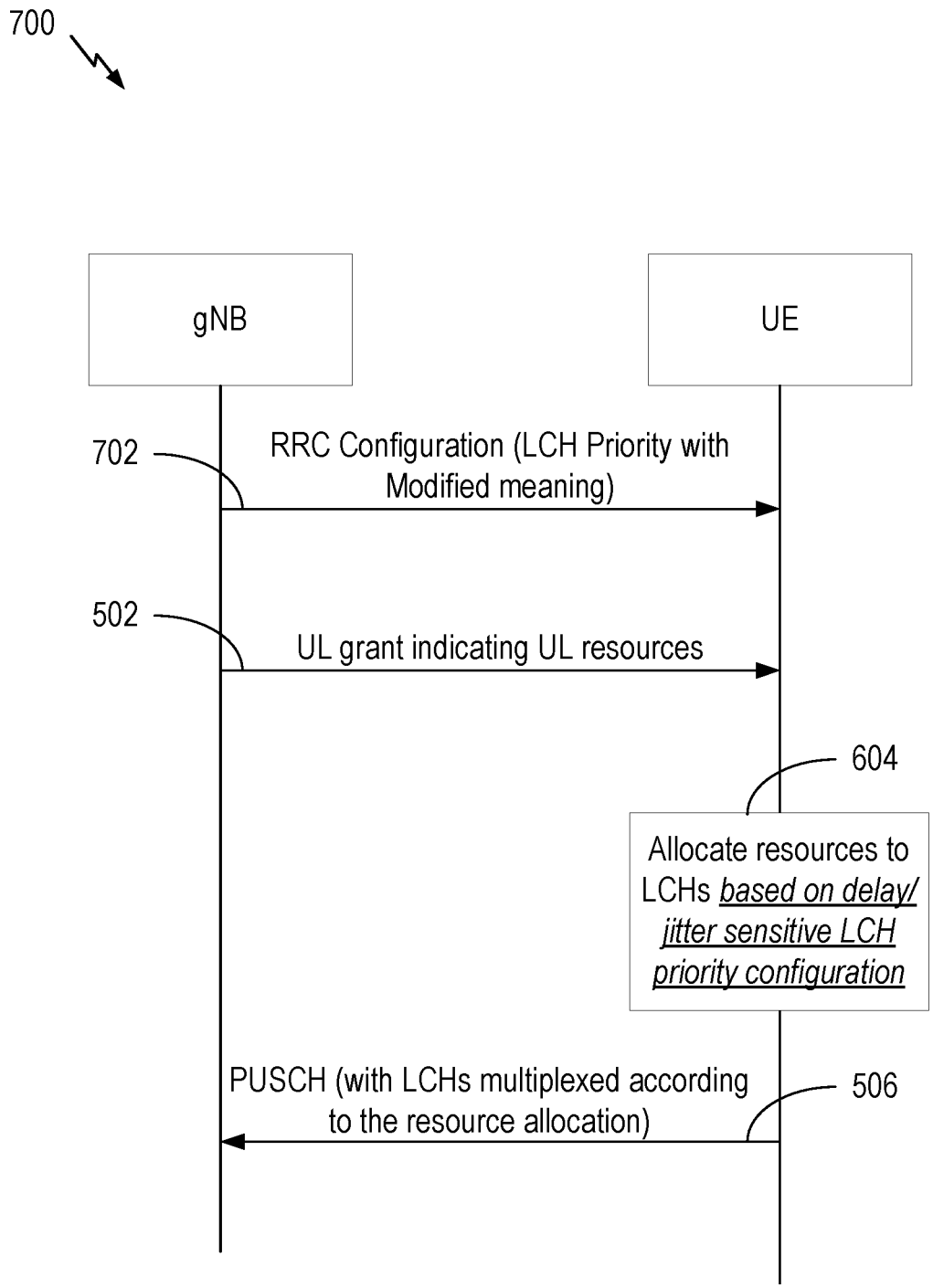
FIG. 7 is a call flow diagram depicting a LCH prioritization procedure having a modified LCH priority meaning, in accordance with certain aspects of the present disclosure.

As illustrated in the example call flow diagram 700 of FIG. 7, in some cases LCH prioritization enhancements may be based on a modification of an LCH priority meaning.

The modified meaning may be conveyed, at 702, as part of an RRC LCH priority configuration. When allocating resources to LCHs, at 704, the UE may do so based on the modified LCH priority meaning.

For example, the RRC signaling may configure the UE such that one or more of the existing priority values are treated in a new/special way. In other words, in this case, the existing priority parameter may not be modified, but some of the LCHs (as per the new configuration) may be treated in a newly defined manner according to the modified meaning, for example, as a function of a packet delay/jitter.

Figure 8:
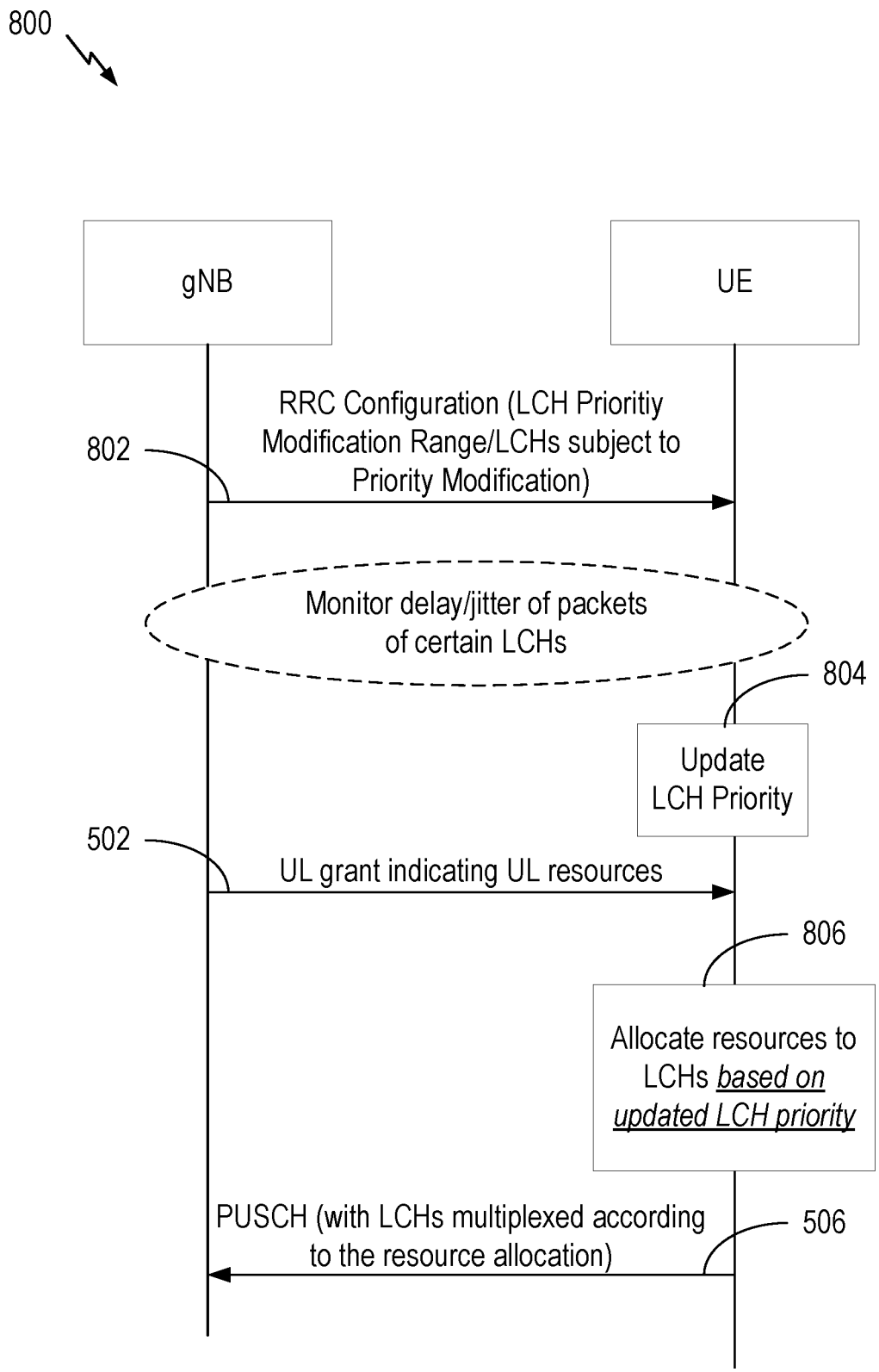
FIG. 8 is a call flow diagram depicting a UE updated LCH priority, in accordance with certain aspects of the present disclosure.

As illustrated in the example call flow diagram 800 of FIG. 8, in some cases the UE may be able to update LCH priority, at 804. For example, the UE may be allowed to modify an LCH priority based on the packet delay of packets of a certain LCHs. In some cases, at 802, the RRC configuration may configure a range of values within which the UE can modify LCH priority and/or may specify which LCHs may be modified.

UE based LCH priority modification may be based on one or more rules. For example, a UE may determine LCH priority by determining the priority value as a function of the delay deadline and/or jitter (e.g., the higher packet delay of the LCH currently experienced may map to a higher priority).

Figure 9:
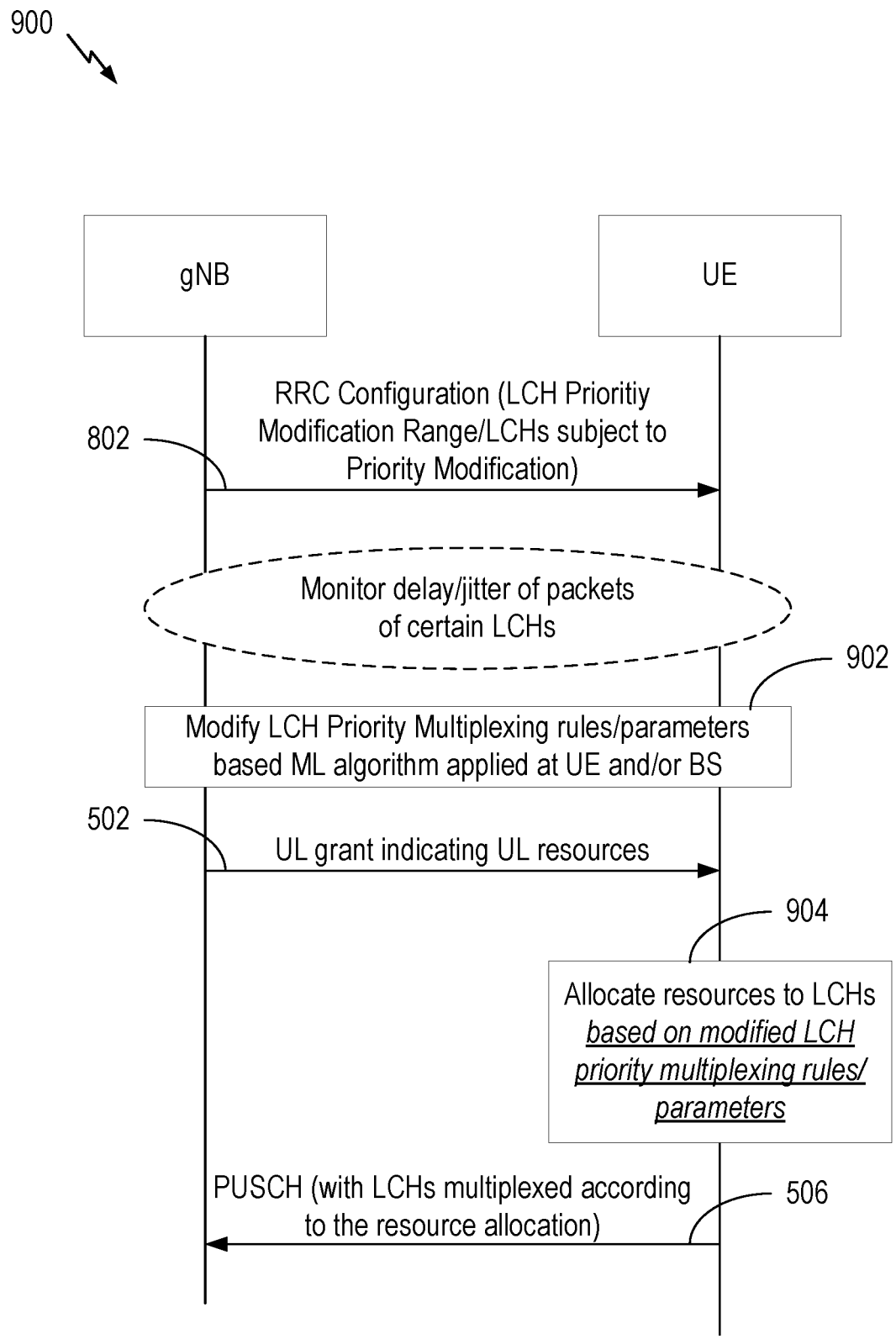
FIG. 9 is a call flow diagram depicting a LCH prioritization modified based on a machine learning (ML) algorithm, in accordance with certain aspects of the present disclosure.

As illustrated in the example call flow diagram 900 of FIG. 9, in some cases LCH priority (UL grant multiplexing rules) may be modified based on machine learning (ML) techniques, at 902. For example, such ML techniques may take into account newly defined attributes (e.g. delay deadline) as well as legacy attributes of the available traffic at the UE and adjust the multiplexing accordingly. In some cases, the ML algorithm may predict packet delays and jitter and adjust the multiplexing.

In some cases, the ML algorithm may be applied at the gNB. For example, based on the ML algorithm, the gNB may adjust the scheduling and traffic prioritization at the UE. In some cases, the gNB may modify the UE multiplexing rules/parameters to adjust for a targeted and/or perceived delay of a specific type of traffic (e.g., associated with a specific LCH).

In some cases, the ML algorithm may be applied at the UE. Based on the ML algorithm, the UE may adjust the traffic prioritization/UL traffic multiplexing at the UE. In some cases, the UE may modify the UE multiplexing rules and parameters to adjust for the current jitter of a specific traffic (e.g., associated with a specific LCH). In some cases, the modifications may be done within the bounds of parameters defined by RRC (e.g., for priority, PBR, and BSD). In some cases, the modification made at the UE may be reported to the gNB. In some cases, the UE may send a request for a parameter modification to the gNB and wait for approval and/or modification from the gNB before implementing the modification. Physical layer (PHY or L1) or MAC layer (L2) signaling may be more suitable for such (notification and/or request) signaling than higher layer (RRC L3) signaling, due to delays.

Figure 10:
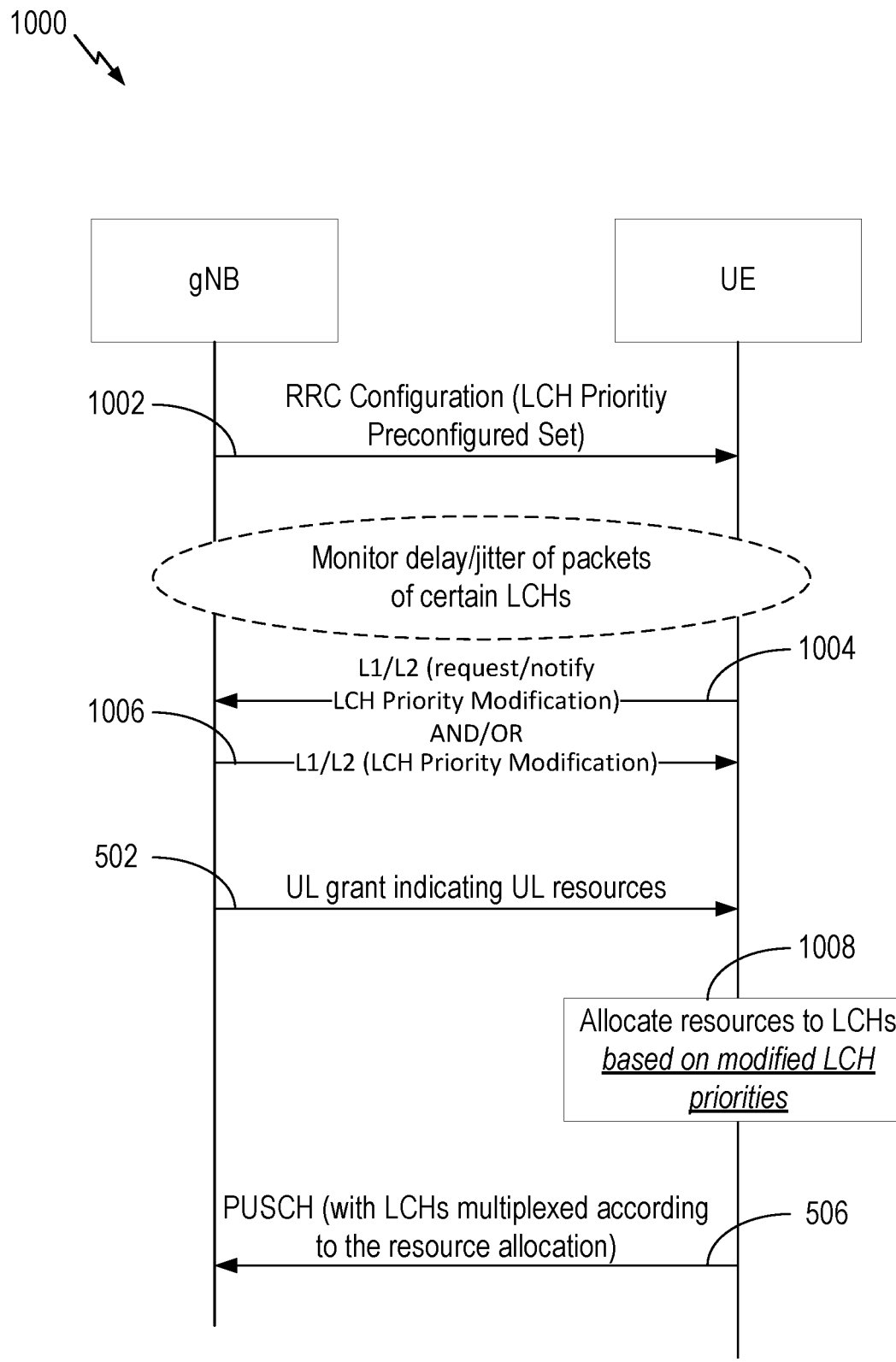
FIG. 10 is a call flow diagram depicting a LCH prioritization, in accordance with certain aspects of the present disclosure.

As noted above, LCH priority is currently RRC configured. However, as illustrated in the call flow diagram 1000 of FIG. 10, to facilitate faster adaptation (e.g., based on required and/or perceived QoS), the LCH priority could be updated more dynamically by L1/L2 signaling.

As illustrated, at 1002, in some cases, the UE may be RRC (pre)configured with a set of LCH priorities). As illustrated, at 1004, in some cases, the gNB may send L1/L2 signaling to the UE to modify the LCH priority. For example, the gNB may dynamically update a current LCH priority value with one of values in the RRC preconfigured set. As an alternative (or in addition, at 1006, the UE may use L1/L2 signaling to request that the gNB update the LCH priority (e.g., with one of values in the RRC preconfigured set). In case, the UE makes the update itself, the UE could use L1/L2 signaling to notify the gNB about the update.

Example Methods

Figure 11:
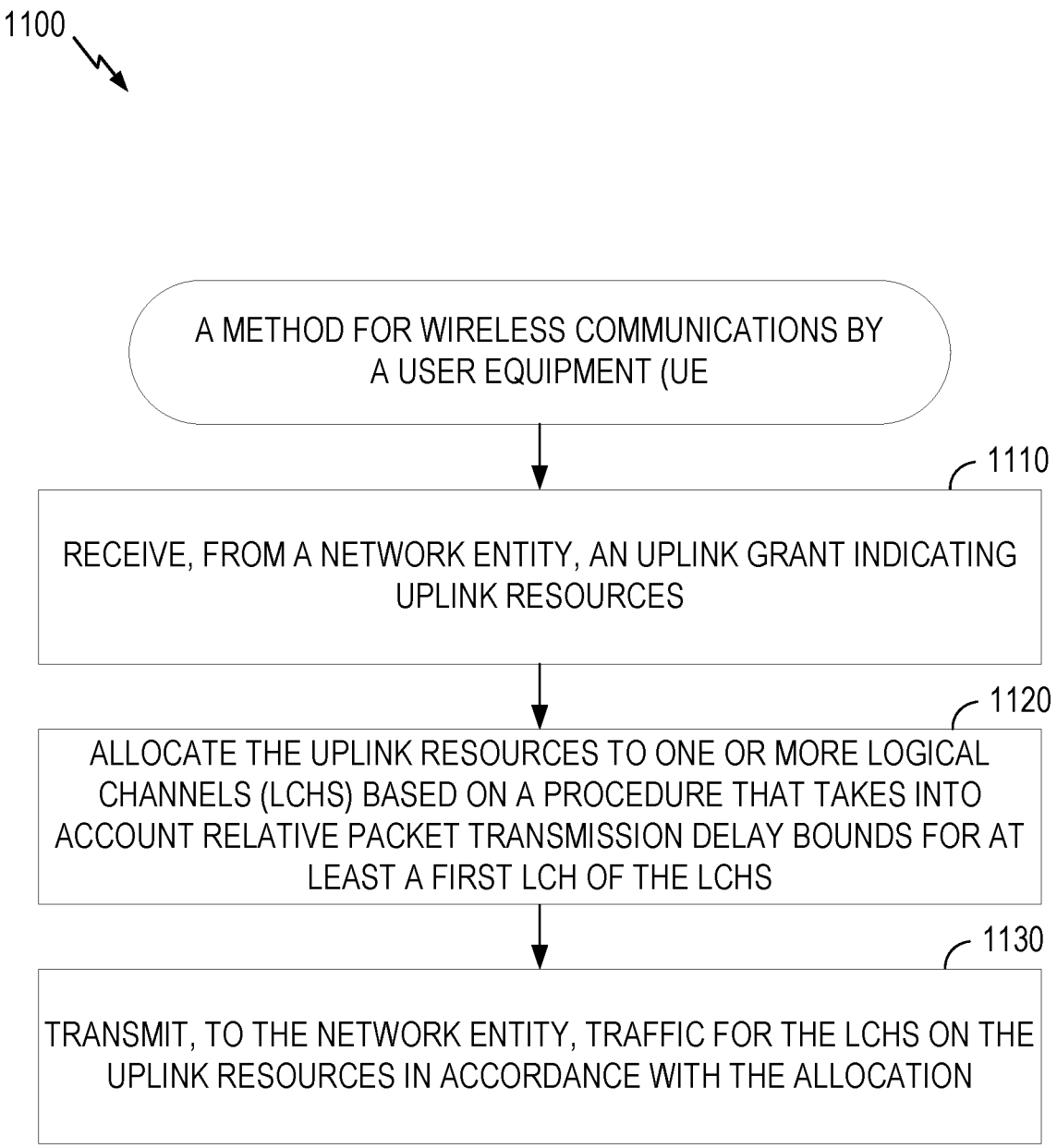
FIG. 11 is a flow diagram illustrating example operations for wireless communication by a UE, in accordance with certain aspects of the present disclosure.

FIG. 11 illustrates example operations 1100 for wireless communication by a UE. The operations 1100 may be performed, for example, by a user equipment (UE) (e.g., such as a UE 104 of FIG. 1) to enhance logical channel prioritization using relative packet transmission delay bounds, in accordance with certain aspects of the present disclosure.

At 1110, the UE receives, from a network entity, an uplink (UL) grant indicating UL resources. For example, a base station (BS) may transmit an UL grant to a UE with UL resources alongside parameters configuring a UE to perform logical channel (LCH) prioritization based on jitter.

At 1120, the UE allocates the uplink resources to one or more logical channels (LCHs) based on a procedure that takes into account relative packet transmission delay bounds for at least a first LCH of the LCHs. The procedure may include, for example, a new definition for a priority value that takes into account packet delay. The procedure may also include, for example, additional priority parameters based on jitter for determining LCH priority.

At 1130, the UE transmits, to the network entity, traffic for the LCHs on the uplink resources in accordance with the allocation. In one example, traffic for the LCHs may constitute LCHs multiplexed at a medium access control (MAC) layer based on a LCH prioritization procedure. The LCH prioritization procedure may be based on packet delay information for each LCH.

Figure 12:
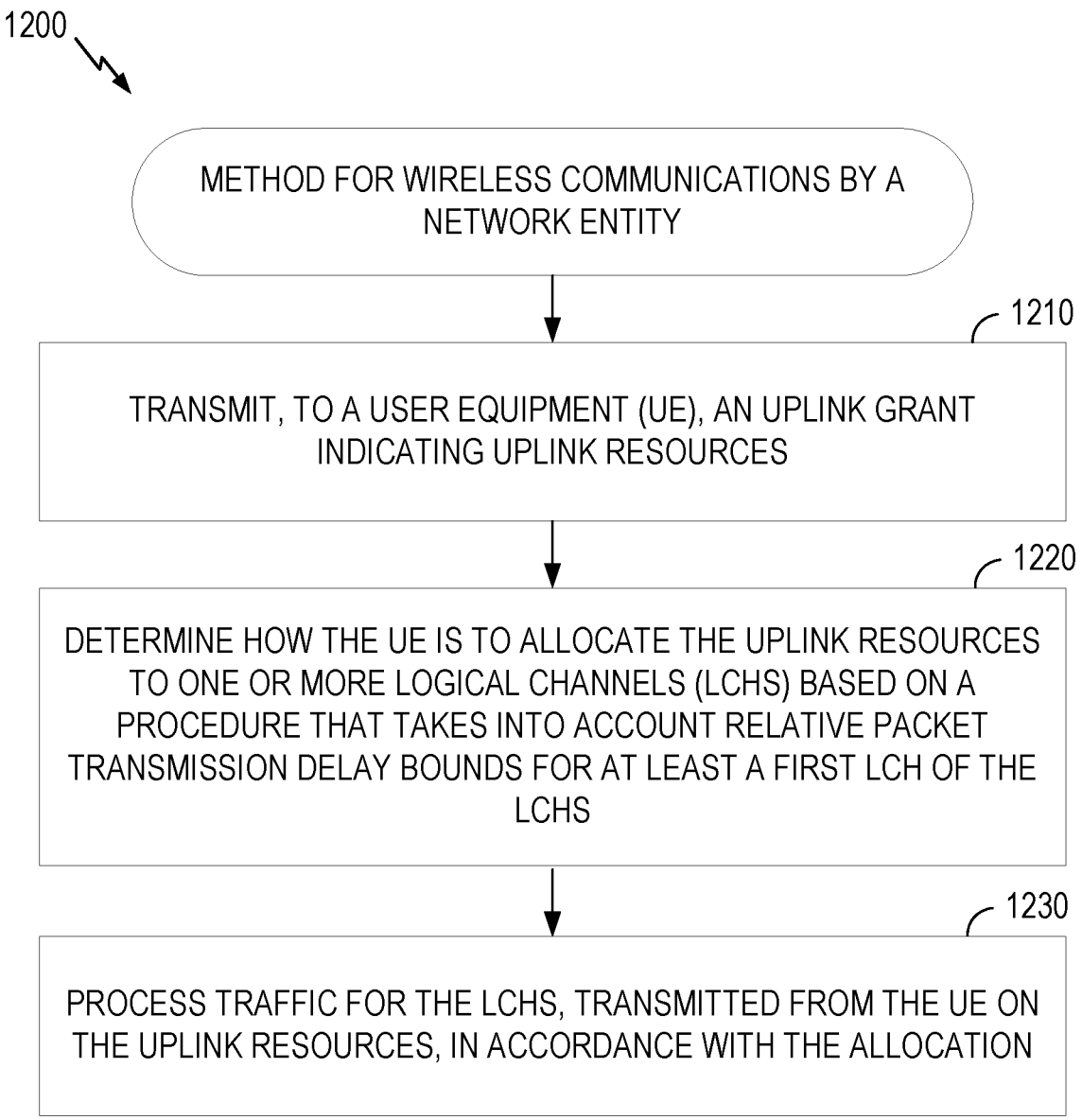
FIG. 12 is a flow diagram illustrating example operations for wireless communication by a network entity, in accordance with certain aspects of the present disclosure.

FIG. 12 illustrates example operations 1200 for wireless communication by a network entity. The operations 1200 may be performed, for example, by a base station (e.g., BS 102 of FIG. 1) to enhance logical channel prioritization using relative packet transmission delay bounds, in accordance with certain aspects of the present disclosure.

At 1210, the network entity transmits, to a user equipment (UE), an uplink grant indicating uplink resources. Resources specified in the uplink grant may be allocated to LCH during a MAN layer LCH priority procedure.

At 1220, the network entity determines how the UE is to allocate the uplink resources to one or more LCHs based on a procedure that takes into account relative packet transmission delay bounds for at least a first LCH of the LCHs. For example, the network entity may transmit prioritization parameters based on delay to the UE via the RRC layer.

Figure 13:
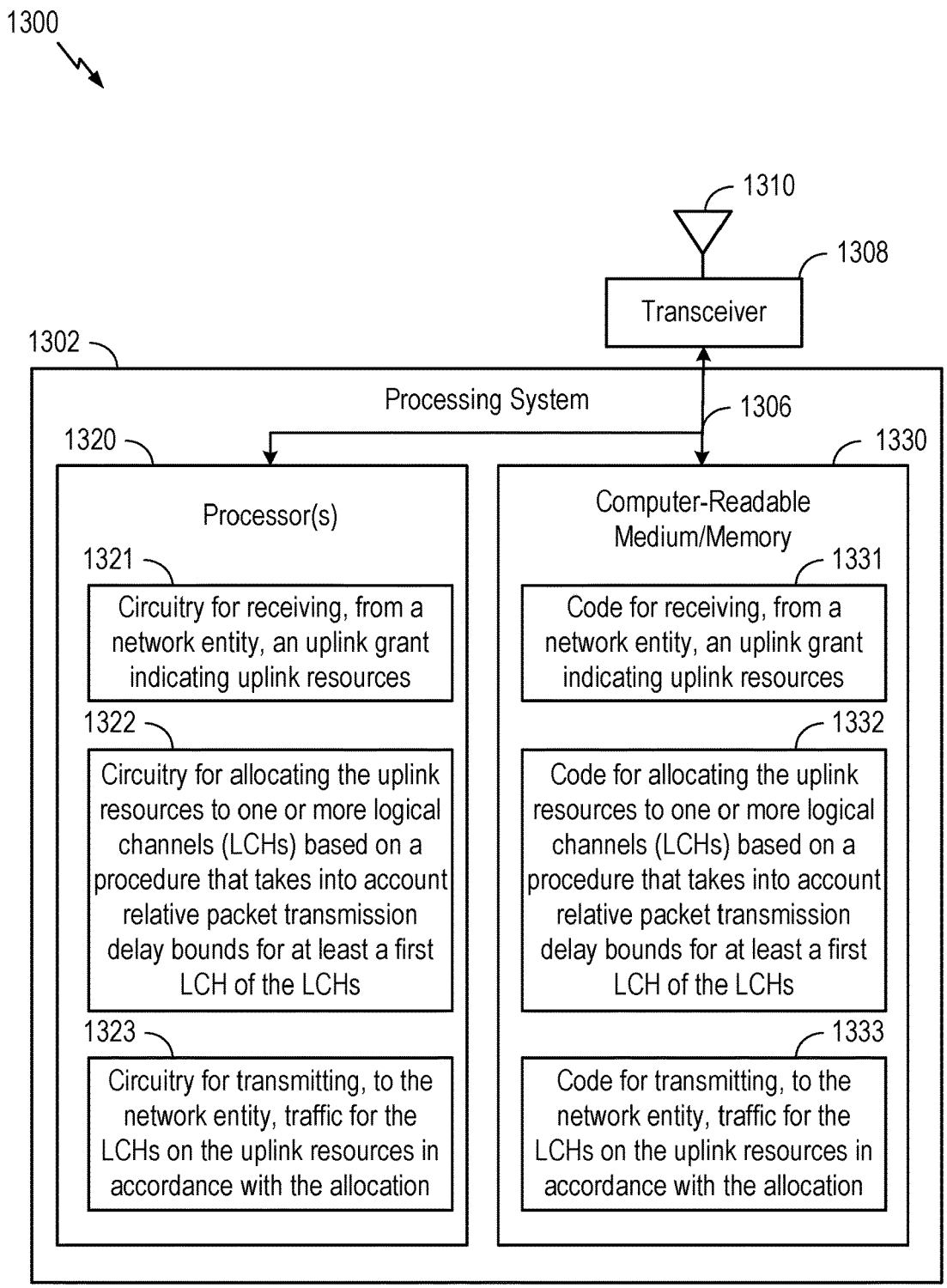
FIG. 13 depicts aspects of an example communications device, in accordance with certain aspects of the present disclosure.

At 1230, the network entity processes traffic for the LCHs, transmitted from the UE on the uplink resources, in accordance with the allocation Example Wireless Communication Devices FIG. 13 depicts an example communications device 1300 that includes various components operable, configured, or adapted to perform operations for the techniques disclosed herein, such as the operations depicted and described with respect to FIG. 11. In some examples, communication device 1300 may be a UE 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 11, or other operations for performing the various techniques discussed herein for enhance LCH prioritization based on jitter.

In the depicted example, computer-readable medium/memory 1330 stores code 1331 for receiving, from a network entity, an uplink grant indicating uplink resources, code 1332 for allocating the uplink resources to one or more logical channels (LCHs) based on a procedure that takes into account relative packet transmission delay bounds for at least a first LCH of the LCHs, and code 1333 for transmitting, to the network entity, traffic for the LCHs on the uplink resources in accordance with the allocation.

In the depicted example, the one or more processors 1320 include circuitry configured to implement the code stored in the computer-readable medium/memory 1330, including circuitry 1321 for receiving, from a network entity, an uplink grant indicating uplink resources, circuitry 1322 for allocating the uplink resources to one or more LCHs based on a procedure that takes into account relative packet transmission delay bounds for at least a first LCH of the LCHs, and circuitry 1323 for transmitting, to the network entity, traffic for the LCHs on the uplink resources in accordance with the allocation.

Various components of communications device 1300 may provide means for performing the methods described herein, including with respect to FIG. 11.

In some examples, means for transmitting and/or sending (or means for outputting for transmission) may include the transceivers 254 and/or antenna(s) 252 of the UE 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communication device 1300 in FIG. 13.

In some examples, means for receiving, allocating, and/or transmitting may include various processing system components, such as: the one or more processors 1320 in FIG. 13, or aspects of the UE 104 depicted in FIG. 2, including receive processor 258, transmit processor 264, TX MIMO processor 266, and/or controller/processor 280 (including LCH prioritization component 281).

Notably, FIG. 13 is an example, and many other examples and configurations of communication device 1300 are possible.

Figure 14:
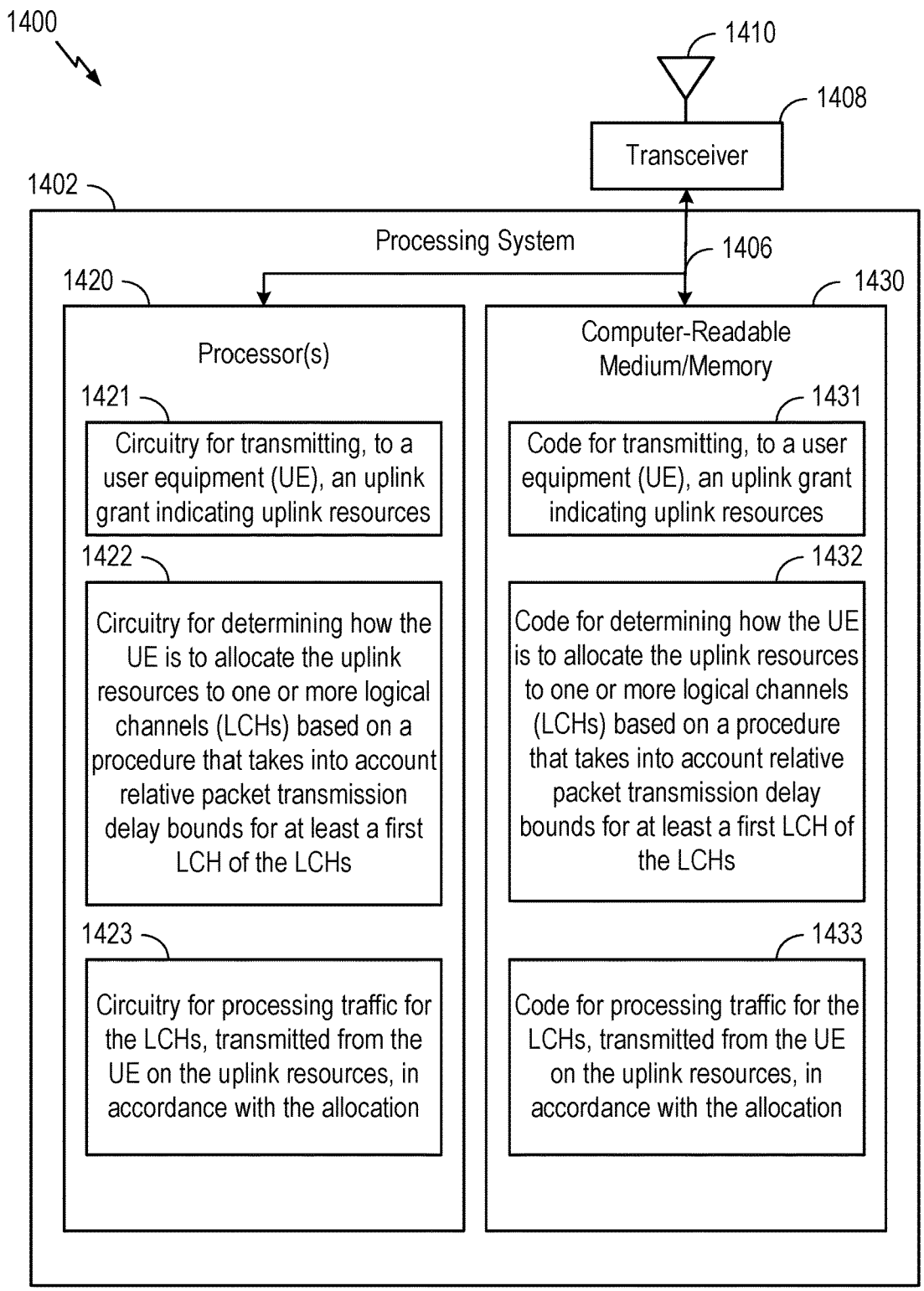
FIG. 14 depicts aspects of an example communications device, in accordance with certain aspects of the present disclosure.

FIG. 14 depicts an example communications device 1400 that includes various components operable, configured, or adapted to perform operations for the techniques disclosed herein, such as the operations depicted and described with respect to FIG. 7. In some examples, communication device 1400 may be a base station 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 12, or other operations for performing the various techniques discussed herein for enhance LCH prioritization based on jitter.

In the depicted example, computer-readable medium/memory 1430 stores code 1431 for transmitting, to a user equipment (UE), an uplink grant indicating uplink resources, code 1432 for determining how the UE is to allocate the uplink resources to one or more logical channels (LCHs) based on a procedure that takes into account relative packet transmission delay bounds for at least a first LCH of the LCHs, and code 1433 for processing traffic for the LCHs, transmitted from the UE on the uplink resources, in accordance with the allocation.

In the depicted example, the one or more processors 1420 include circuitry configured to implement the code stored in the computer-readable medium/memory 1430, including circuitry 1421 for transmitting, to a user equipment (UE), an uplink grant indicating uplink resources, circuitry 1422 for determining how the UE is to allocate the uplink resources to one or more logical channels (LCHs) based on a procedure that takes into account relative packet transmission delay bounds for at least a first LCH of the LCHs, and circuitry 1423 for processing traffic for the LCHs, transmitted from the UE on the uplink resources, in accordance with the allocation.

Various components of communications device 1400 may provide means for performing the methods described herein, including with respect to FIG. 12.

In some examples, means for transmitting and/or sending (or means for outputting for transmission) may include the transceivers 234 and/or antenna(s) 232 of the base station 102 illustrated in FIG. 2 and/or transceiver 1408 and antenna 1410 of the communication device 1400 in FIG. 14.

In some examples, means for receiving (or means for obtaining) may include the transceivers 232 and/or antenna (s) 234 of the base station 102 illustrated in FIG. 2 and/or transceiver 1408 and antenna 1410 of the communication device 1400 in FIG. 14.

In some examples, means for transmitting, determining, and/or processing may include various processing system components, such as: the one or more processors 1420 in FIG. 14, or aspects of the base station 102 depicted in FIG. 2, including receive processor 238, transmit processor 220, TX MIMO processor 230, and/or controller/processor 240 (including LCH prioritization component 241).

Notably, FIG. 14 is an example, and many other examples and configurations of communication device 1400 are possible.

Example Clauses

Implementation examples are described in the following numbered clauses:

Clause 1: A method for wireless communications by a user equipment (UE), comprising receiving, from a network entity, an uplink grant indicating uplink resources, allocating the uplink resources to one or more logical channels (LCHs) based on a procedure that takes into account relative packet transmission delay bounds for at least a first LCH of the LCHs, and transmitting, to the network entity, traffic for the LCHs on the uplink resources in accordance with the allocation.

Claim 2: The clause of claim 1, wherein the procedure is applicable to an LCH with a certain configured LCH priority.

Clause 3: The method of any one of clauses 1 and 2, wherein the procedure is based on a token bucket procedure that takes into account relative packet transmission delay bounds.

Clause 4: The method of any one of clauses 2 and 3, wherein the configured LCH priority is indicated by a priority parameter value, or a combination of a priority parameter value and an additional parameter.

Clause 5: The method of clause 4, wherein the procedure takes into account one or more attributes related to the priority parameter value or the combination.

Clause 6: The method of any one of clauses 1 through 5, further comprising receiving radio resource control (RRC) signaling indicating LCH priority values for the LCHs, and one or more of the LCH priority values to apply the procedure that takes into account relative packet transmission delay bounds.

Clause 7: The method of any one of clauses 1 through 6, further comprising receiving radio resource control (RRC) signaling indicating LCH priority values for the LCHs, and modifying the LCH priority value for one or more of the LCHs based on at least one of delay or jitter of corresponding packets.

Clause 8: The method of clause 7, wherein the UE is allowed to modify the LCH priority value with a configured range.

Clause 9: The method of any one of clauses 7 and 8, further comprising receiving an indication of the one or more LCHs for which the UE is allowed to modify the indicated LCH priority values.

Clause 10: The method of any one of clauses 1 through 9, wherein the procedure is based on machine learning (ML) algorithm applied at the UE.

Clause 11: The method of clause 10, wherein the ML algorithm modifies at least one of multiplexing rules or parameters to adjust the procedure based on at least one of targeted or observed delay or jitter of a specific LCH.

Clause 12: The method of clause 11, wherein the modification of parameters is within a configured range.

Clause 13: The method of any one of clauses 11 and 12, further comprising reporting the modification to the network entity.

Clause 14: The method of any one of clauses 11 through 13, comprising sending a request for approval to perform the modification to the network entity, and performing the modification after receiving approval from the network entity.

Clause 15: The method of any one of clauses 1 through 14, further comprising receiving radio resource control (RRC) signaling indicating LCH priority values for the LCHs, and modifying the LCH priority value for one or more of the LCHs based on at least one of physical layer or medium access control (MAC) layer signaling.

Clause 16: The method of clause 15, wherein the modification is based on an indication received via downlink control information (DCI) or MAC control element (MAC CE) signaling from the network entity.

Clause 17: The method of any one of clauses 15 and 16, wherein the UE requests approval to perform the modification or notifies the network entity of the modification via uplink control information (UCI) or MAC control element (MAC CE) signaling from the network entity.

Clause 18: A method for wireless communications by a network entity, comprising transmitting, to a user equipment (UE), an uplink grant indicating uplink resources, determining how the UE is to allocate the uplink resources to one or more logical channels (LCHs) based on a procedure that takes into account relative packet transmission delay bounds for at least a first LCH of the LCHs; and processing traffic for the LCHs, transmitted from the UE on the uplink resources, in accordance with the allocation.

Clause 19: The method of clause 18, wherein the procedure is applicable to an LCH with a certain configured LCH priority.

Clause 20: The method of clause 19, wherein the procedure is based on a token bucket procedure that takes into account relative packet transmission delay bounds.

Clause 21: The method of any one of clauses 19 and 20, wherein the configured LCH priority is indicated by a priority parameter value, or a combination of a priority parameter value and an additional parameter.

Clause 22: The method of clause 21, wherein the procedure takes into account one or more attributes related to the priority parameter value or the combination.

Clause 23: The method of any one of clauses 18 through 22, further comprising transmitting radio resource control (RRC) signaling indicating LCH priority values for the LCHs, and one or more of the LCH priority values to apply the procedure that takes into account relative packet transmission delay bounds.

Clause 24: The method of any one of clauses 18 through 23, further comprising transmitting radio resource control (RRC) signaling indicating LCH priority values for the LCHs.

Clause 25: The method of any one of clauses 18 through 24, wherein the procedure is based on machine learning (ML) algorithm applied at the network entity.

Clause 26: The method of clause 25, wherein the ML algorithm modifies at least one of multiplexing rules or parameters to adjust the procedure based on at least one of targeted or observed delay or jitter of a specific LCH.

Clause 27: The method of any one of clauses 25 and 26, wherein the ML algorithm adjusts scheduling and traffic prioritization for the UE.

Clause 28: The method of any one of clauses 24 through 27, wherein the indication is transmitted via downlink control information (DCI) or MAC control element (MAC CE) signaling from the network entity.

Clause 29: The method of any one of clauses 24 through 28, wherein the UE requests approval to perform a modification or notifies the network entity of the modification via uplink control information (UCI) or MAC control element (MAC CE) signaling from the network entity.

Clause 30: An apparatus, comprising: a memory comprising executable instructions; one or more processors configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by one or more processors of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of enhancing logical channel prioritization using relative packet transmission delay bounds in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
   receiving, from a network entity, an uplink grant indicating uplink resources for one or more logical channels (LCHs);
   receiving radio resource control (RRC) signaling indicating LCH priority values for the one or more LCHs; and
   allocating the uplink resources to the one or more LCHs based on a procedure that takes into account relative packet transmission delay bounds for at least a first LCH of the one or more LCHs, wherein:
      allocating the uplink resources includes modifying the LCH priority values for the one or more of the LCHs based on at least one of delay or jitter of corresponding packets; and
   transmitting, to the network entity, traffic for the one or more LCHs on the uplink resources in accordance with the allocation.

2. The method of claim 1, wherein the procedure is applicable to an LCH with a certain configured LCH priority.

3. The method of claim 2, wherein the procedure is based on a token bucket procedure that takes into account the relative packet transmission delay bounds.

4. The method of claim 2, wherein the configured LCH priority is indicated by:
   a priority parameter value; or
   a combination of a priority parameter value and an additional parameter.

5. The method of claim 4, wherein the procedure takes into account one or more attributes related to the priority parameter value or the combination.

6. The method of claim 1, further comprising receiving radio resource control (RRC) signaling indicating:
   one or more of the LCH priority values to apply the procedure that takes into account relative packet transmission delay bounds.

7. The method of claim 1, wherein the UE is allowed to modify the LCH priority value with a configured range.

8. The method of claim 1, further comprising receiving an indication of the one or more LCHs for which the UE is allowed to modify the indicated LCH priority values.

9. The method of claim 1, wherein the procedure is based on machine learning (ML) algorithm applied at the UE.

10. The method of claim 9, wherein the ML algorithm modifies at least one of multiplexing rules or parameters to adjust the procedure based on at least one of targeted or observed delay or jitter of a specific LCH.

11. The method of claim 10, wherein the modification of parameters is within a configured range.

12. The method of claim 10, further comprising reporting the modification to the network entity.

13. The method of claim 10, comprising:
   sending a request for approval to perform the modification to the network entity; and
   performing the modification after receiving approval from the network entity.

14. The method of claim 1, wherein
   modifying the LCH priority value for one or more of the one or more LCHs is based on at least one of physical layer signaling or medium access control (MAC) layer signaling.

15. The method of claim 14, wherein the modification is based on an indication received via downlink control information (DCI) or MAC control element (MAC CE) signaling from the network entity.

16. The method of claim 14, wherein the UE requests approval to perform the modification or notifies the network entity of the modification via uplink control information (UCI) or MAC control element (MAC CE) signaling from the network entity.

17. A method for wireless communications by a network entity, comprising:
   transmitting, to a user equipment (UE), an uplink grant indicating uplink resources;
   transmitting radio resource control (RRC) signaling indicating LCH priority values for the one or more LCHs;
   determining how the UE is to allocate the uplink resources to the one or more LCHs based on a procedure that takes into account relative packet transmission delay bounds for at least a first LCH of the one or more LCHs, wherein:
      the procedure modifies the LCH priority values for one or more of the LCHs based on at least one of delay or jitter of corresponding packets; and
   processing traffic for the one or more LCHs, transmitted from the UE on the uplink resources, in accordance with the allocation.

18. The method of claim 17, wherein the procedure is applicable to an LCH with a certain configured LCH priority.

19. The method of claim 18, wherein the procedure is based on a token bucket procedure that takes into account relative packet transmission delay bounds.

20. The method of claim 18, wherein the configured LCH priority is indicated by:
   a priority parameter value; or
   a combination of a priority parameter value and an additional parameter.

21. The method of claim 20, wherein the procedure takes into account one or more attributes related to the priority parameter value or the combination.

22. The method of claim 17, further comprising transmitting radio resource control (RRC) signaling indicating:
   one or more of the LCH priority values to apply the procedure that takes into account relative packet transmission delay bounds.

23. The method of claim 17, wherein the procedure is based on machine learning (ML) algorithm applied at the network entity.

24. The method of claim 23, wherein the ML algorithm modifies at least one of multiplexing rules or parameters to adjust the procedure based on at least one of targeted or observed delay or jitter of a specific LCH.

25. The method of claim 23, wherein the ML algorithm adjusts scheduling and traffic prioritization for the UE.

26. The method of claim 17, wherein the indication is transmitted via downlink control information (DCI) or MAC control element (MAC CE) signaling from the network entity.

27. An apparatus for wireless communications by a user equipment (UE), comprising:
   one or more processors, individually or collectively, configured to execute instructions stored on one or more memories and to cause the UE to:
      receive, from a network entity, an uplink grant indicating uplink resources;

receiving radio resource control (RRC) signaling indicating LCH priority values for the one or more LCHs; and allocating the uplink resources to the one or more LCHs based on a procedure that takes into account relative packet transmission delay bounds for at least a first LCH of the one or more LCHs, wherein:

in order to allocate the uplink resources, the one or more processors are further configured to modify the LCH priority value for the one or more of the LCHs based on at least one of delay or jitter of corresponding packets; and transmit, to the network entity, traffic for the one or more LCHs on the uplink resources in accordance with the allocation.

28. An apparatus for wireless communications by a network entity, comprising:

a memory and at least one processor coupled to the memory, the memory and the at least one processor being configured to:

transmit, to a user equipment (UE), an uplink grant indicating uplink resources;

transmit radio resource control (RRC) signaling indicating LCH priority values for the one or more LCHs;

determine how the UE is to allocate the uplink resources to the one or more LCHs based on a procedure that takes into account relative packet transmission delay bounds for at least a first LCH of the one or more LCHs, wherein:

the procedure modifies the LCH priority values for one or more of the LCHs based on at least one of delay or jitter of corresponding packets; and process traffic for the LCHs, transmitted from the UE on the uplink resources, in accordance with the allocation.

* * * * *